United States Patent Office 2,851,471
Patented Sept. 9, 1958

2,851,471
OXIDATION OF CASTOR OIL

Joseph Nichols, Princeton, N. J., assignor to Ethicon, Inc., a corporation of New Jersey No Drawing. Application July 13, 1954
Serial No. 443,165

12 Claims. (Cl. 260—406)

This invention relates to the kentonization of castor oil by oxidation and particularly relates to the oxidative conversion of the hydroxy groups of glycerol ricinoleates present in castor oil to keto groups.

Castor oil is a triglyceride oil in which 88–93 percent of the fatty acid component is ricinoleic acid and 7–12 percent consists of oleic, stearic, linoleic, and dihydroxy stearic acid. The ricinoleic acid component has a beta-gamma unsaturated alcohol group. Although the hydroxy group of beta-gamma unsaturated alcohols has heretofore been oxidized by means of an aluminum secondary or tertiary alkoxide in the presence of a hydrogen acceptor such as a low molecular weight ketone, oxidation by such means has generally resulted in a shift in the position of the double bond and the production of alpha-beta unsaturated ketones.

It has now been discovered that the hydroxyl group of the ricinoleic acid moiety of the glycerol ricinoleates present in castor oil may be oxidized to a keto group without saponification of the glycerol ricinoleates so as to produce ketonized castor oil in which the fatty acid moieties contain a double bond positioned either alpha-beta or beta-gamma with respect to the keto group. The oxidation is conducted in an organic solvent by means of an aluminum secondary or tertiary alkoxide in the presence of a hydrogen acceptor such as a low molecular weight ketone.

In general, the method of this invention for the oxidation of castor oil is as follows:

A quantity of castor oil is dissolved in a large excess of an organic solvent which is inert with respect to the oxidizing agent, and preferably an aromatic hydrocarbon such as xylene, toluene, or benzene and an excess of a low molecular weight, aliphatic ketone such as acetone or methyl ethyl ketone, or cyclohexanone, precautions being taken to ensure that the solution is anhydrous. An excess of aluminum secondary or tertiary alkoxide in which the alkyl group is of low molecular weight, and preferably aluminum isopropoxide, or aluminum tertiary butoxide, is dissolved in an anhydrous organic solvent, and preferably an aromatic hydrocarbon such as xylene, toluene, or benzene and added to the solution of the acid. The reaction mixture is heated and refluxed, and precautions are taken to exclude moisture during heating and refluxing. Refluxing the reaction mixture for a period of time of from five minutes to about 15 minutes at a temperature not substantially above 115° C. results in a ketonized castor oil in which the fatty acid moieties contain a double bond positioned predominantly in the beta-gamma position with respect to the keto group. If the time of refluxing is less than about five minutes, a substantial amount of unoxidized castor oil is recovered unchanged; and if the refluxing time exceeds about 15 minutes, a substantial amount of glycerides of 12-keto-10-octadecenoic acid are obtained as well as the desired glycerides of 12-keto oleic acid. Refluxing the reaction mixture for a period of time longer than 15 minutes results in a ketonized castor oil in which shifting of the double bond of the fatty acid moieties to the alpha-beta position with respect to the keto group has taken place. As the time of refluxing is increased the amount of shifting of the double bond is increased and shifting of the double bond is still further increased by elevating the reflux temperature. Ketonized castor oil in which the double bond of the fatty acid moieties is predominantly positioned alpha-beta with respect to the keto group is obtained by refluxing of the reaction mixture for at least about 45 minutes when the reflux temperature is not substantially above 115° C. For the preparation of ketonized castor oil in which the double bond of the fatty acid moieties is predominantly positioned beta-gamma with respect to the keto group, it is preferred that the reflux temperature be 110°–115° C. and the time of refluxing ten to fifteen minutes. And for the preparation of ketonized castor oil in which the double bond of the fatty acid moieties is predominantly positioned alpha-beta with respect to the keto group, it is preferred that the reflux temperature be 126°–130° C. and the time of refluxing one to six hours.

At the end of the reflux period, the reaction mixture is cooled and washed several times with dilute mineral acid. The washings are combined, extracted with an organic solvent, and preferably an aromatic hydrocarbon such as xylene, benzene or toluene, and the solution is washed with water until the pH of the wash water is within the approximate range of 4 to 5. The solution of the reaction product is dried over a drying agent, the drying agent is removed, and the organic solvent is removed by distillation under reduced pressure. The residual oil may be further purified by washing with aqueous ethanol.

For the purpose of illustration, the following examples of the oxidation of castor oil are set forth:

Example I 180 grams of castor oil, 1800 milliliters of toluene and 900 milliliters of cyclohexanone in a 5-liter, 3-neck flask fitted with a mechanical stirrer, thermometer, Dean-Stark water trap, and reflux condenser, were heated to reflux and maintained at a reflux until water was no longer evolved. A solution of 180 grams of aluminum tertiary-butoxide dissolved in 900 milliliters of toluene was slowly added to the solution of castor oil in toluene and cyclohexanone. The reaction mixture was refluxed for 15 minutes and then rapidly cooled with an ice-water mixture. The cooled reaction mixture was successively washed wtih five 500 milliliter portions of 10 percent sulphuric acid, and then washed with water until the pH was 4.5, and dried over anhydrous sodium sulfate. The organic solvents were removed from the reaction mixture by distillation at a pressure of 0.3 millimeter of mercury. When the temperature of the distillate reached 65° C. the distillation was discontinued. The residual oil was dissolved in 700 milliliters of ethanol and precipitated by the addition of 180 millliters of water. The precipitation was repeated an additional four times, using the same amounts of ethanol and water, and the final precipitated oil was dissolved in petroleum ether and dried over anhydrous sodium sulfate. The petroleum ether was removed by distillation at a pressure of 0.3 millimeter of mercury and, when the temperature of the distillate reached 65° C., distillation was discontinued. 140 grams of light yellow oil having a viscosity of 1.10 poises at 25° C. were obtained. The oil had an acid number of 0.40, 86.4 percent of the theoretical number of keto groups for glycerol tri-12-keto oleate, and a refractive index at 27° C. of 1.4763. 10 grams of the light yellow oil were reprecipitated four times from 200 milliliters of ethanol at 0° C. The reprecipitated material was a colorless oil having a melting point of 27–28° C., a refractive index at 27° of 1.4748, and 95.0 percent of the theoretical number of keto groups for glycerol tri-12-keto oleate.

Example II 20 grams of castor oil, 100 milliliters of toluene and 100 milliliters of cyclohexanone were heated to reflux with stirring and maintained at reflux until water was no longer evolved. A solution of 40 grams of aluminum isopropoxide and 200 milliliters of toluene were slowly added to the solution of castor oil in toluene and cyclohaxanone, and the reaction mixture was refluxed for 15 minutes at a reflux temperature of 114° C. and then rapidly cooled with an ice-water mixture. The cooled reaction mixture was successively washed with five 50 milliliter portions of 10 percent sulphuric acid, and then washed with water until the pH was about 4.5 and dried over anhydrous sodium sulfate. The organic solvents were removed from the reaction mixture by distillation at a pressure of 0.3 millimeter of mercury and when the temperature of the distillate reached 65° C. the distillation was discontinued and the residual oil was dissolved in 70 milliliters of ethanol and precipitated by the addition of 20 milliliters of water. The precipitation was repeated four times using the same amounts of ethanol and water and the final precipitated oil was dissolved in petroleum ether and dried over anhydrous sodium sulfate. The petroleum ether was removed by distillation at a pressure of 0.3 millimeter of mercury and the distillation was discontinued when the temperature of the distillate was 65° C. The fifteen grams of residual light yellow oil obtained had an acid number of 0.75, 76.5 percent of the theoretical number of keto groups for glycerol tri-12-keto oleate, and a refractive index at 25° C. of 1.4772.

Example III

Twenty grams of castor oil dissolved in 100 milliliters of xylene and 100 milliliters of cyclohexanone were heated with stirring to reflux and maintained at a reflux temperature until water was no longer evolved. A solution of 40 grams of aluminum isopropoxide in 200 milliliters of toluene was slowly added to the solution of castor oil in xylene and cyclohexanone. The reaction mixture was refluxed for fifteen minutes, the reflux temperature being 110° C., and then rapidly cooled with an ice-water mixture. The cooled reaction mixture was successively washed with five 50 milliliter portions of 10 percent sulphuric acid, and then washed with water until the pH was about 4.5 and dried over anhydrous sodium sulfate. The organic solvents were removed from the reaction mixture by distillation at a pressure of 0.3 millimeter of mercury and the distillation was discontinued when the temperature of the distillate reached 65° C. Twenty grams of light yellow oil having an acid number of 10.7, 60.4 percent of the theoretical number of keto groups for glycerol tri-12-keto oleate, and a refractive index at 25° C. of 1.4753 were obtained.

Example IV

Ten grams of castor oil were dissolved in a solution of 100 milliliters of toluene and 100 milliliters of cyclohexanone and the solution was heated with stirring to reflux and maintained at a reflux temperature until water was no longer evolved. A solution of 20 grams of aluminum isopropoxide in 200 milliliters of toluene was slowly added to the solution of castor oil in toluene and cyclohexanone. The reaction mixture was refluxed for five minutes, the reflux temperature being 114° C., and then rapidly cooled with an ice-water mixture. The cooled reaction mixture was successively washed with five 25 milliliter portions of 10 percent sulfuric acid, and then washed with water until the pH was about 4.5 and dried over anhydrous sodium sulfate. The organic solvents were removed from the reaction mixture by distillation at a pressure of 0.3 millimeter of mercury and the distillation was discontinued when the temperature of the distillate reached 65° C. 4.95 grams of a light yellow oil having an acid number of 1.0, a refractive index at 25° C. of 1.4769 and 80.2 percent of the theoretical number of keto groups for glycerol tri-12-keto oleate were obtained.

Example V 180 grams of castor oil, 1800 milliliters of xylene, and 900 milliliters of cyclohexanone in a 5-liter, 3-neck flask fitted with a mechanical stirrer, thermometer, Dean-Stark water trap and reflux condenser were heated to reflux and maintained at a reflux until water was no longer evolved. A hot solution of 180 grams of aluminum tertiary butoxide dissolved in 900 milliliters of xylene was slowly added to the hot solution of castor oil in xylene and cyclohexanone. The reaction mixture was refluxed for one hour and then cooled. The cooled reaction mixture was successively washed with five 500 milliliter portions of 10 percent sulphuric acid and then washed with water until the pH of the wash water was 7, and dried over anhydrous sodium sulfate. The organic solvents were removed from the reaction mixture by distillation at a pressure of 0.3 millimeter of mercury. When the temperature of the distillate reached 185° C. the distillation was discontinued. The residual oil was dissolved in 450 milliliters of absolute ethanol, filtered, cooled in an ice bath for five hours and filtered. The yellow crystalline solid obtained was recrystallized from 150 milliliters of absolute ethanol. 52 grams of glycerol tri-12-keto-10-octadecenoate were obtained. The crystalline acid had a melting point of 46–47° C., an acid number of 0.231, and 95.2 percent of the theoretical number of keto groups for glycerol tri-12-keto-10-octadecenoate. The crystalline acid was recrystallized five times from absolute ethanol and then had a melting point of 49–50° C., an acid number of 0.0, and 100 percent of the theoretical number of keto groups for glycerol tri-12-keto-10-octadecenoate.

The ketonized oils may be bodied by heat, and a bodied oil of any desired viscosity may be obtained by varying the duration and temperature of the heating period. The time of heating at 300° C. required to convert the ketonized oils to a friable solid gel is about three hours for the oil in which the double bond of the fatty acid moieties is positioned predominantly beta-gamma with respect to the keto group and about one hour to one and one-quarter hours for the oil in which the double bond of the fatty acid moieties is positioned predominantly alpha-beta with respect to the keto group. The ketonized oils do not air-dry to a tack-free film but tack-free films may be obtained by the addition of catalytic amounts of drying oil catalysts such as lead, manganese, and cobalt naphthenates.

The ketonized oils may be reacted with styrene in the presence of a solvent such as benzene, xylene, or toluene and a small amount of a catalyst such as benzoyl peroxide, by refluxing the reaction mixture. Films deposited from solutions of the product of a ketonized oil-styrene reaction are tack-free after about twenty-four hours. Tack-free films may be obtained after three to eight hours if a catalytic amount of a drying oil catalyst such as lead, manganese, or cobalt naphthenate is present.

Novel varnish oils may also be prepared by reacting ketonized oils at an elevated temperature with synthetic and natural resins such as phenolic resins, melamine formaldehyde resins, urea formaldehyde resins, rosin, and hydrogenated rosin.

The ketonized oils are compatible with cellulose derivatives such as nitrocellulose, ethylcellulose, and cellulose acetate, and polymeric substances such as polymethylmethacrylate and polyvinylchloride and consequently may be used as plasticizers for such materials. Mixtures of a ketonized oil with such substances in the ratio of 1 to 2 respectively, deposit a clear, unfrosted film from a solvent solution. The ketonized oils are soluble in petroleum ether as well as alcohol.

The ketonized oils may be bodied by air-blowing and when a stream of air is passed through a ketonized oil maintained at room temperature, the viscosity and refractive index increase gradually during a period of about 18 days; only a slight increase in viscosity and refractive index occur by continuing the passage of air through the oil thereafter; however, passage of air through a ketonized oil at elevated temperatures results in an increasingly viscous material and eventually in a friable gel. The color of the oil does not change noticeably during air-blowing. Keto and acid numbers are increased by air-blowing and the oxygen content of the oil increases from about 15 percent to about 23 percent by air-blowing for eleven days. The viscosity of the ketonized oils increases from 1.10 poises at 25° C. to 4.35 poises at 25° C. after 11 days of air-blowing at room temperature.

The following examples illustrate air-blowing of ketonized oils, the reaction of ketonized oils with styrene and the reaction of air-blown ketonized oils with styrene.

*Example VI*

A stream of air was passed through 50 grams of the ketonized oil obtained by the procedure of Example I for 50 days, the oil being maintained at room temperature. The refractive index at 25° C., acid number, and the number of keto groups expressed in percent of theoretical for glycerol tri-12-keto oleate, for the initial oil and for air-blown oil at intervals up to 50 days are given in the table below:

| Time, Days | Refractive Index | Acid No. | Keto Groups |
|---|---|---|---|
| 0 | 1.4772 | 0.00 | 95 |
| 3 | 1.4776 | | |
| 7 | 1.4786 | 1.03 | 106 |
| 11 | 1.4805 | 5.20 | 122 |
| 13 | 1.4814 | | |
| 15 | 1.4832 | | |
| 20 | 1.4843 | | |
| 50 | 1.4842 | 79.5 | |

The viscosity of the oil after eleven days of air-blowing at room temperature was 4.35 poises at 25° C.

*Example VII*

Twenty grams of redistilled styrene, 20 grams of ketonized castor oil obtained according to Example I, 40 grams of xylene and 1 gram of benzoyl peroxide were stirred and heated at a reflux temperature for 16 hours, the reflux temperature being 105° C. The styrenated oil produced formed a clear, tacky film which became tack-free after standing for 24 hours.

*Example VIII*

Twenty grams of redistilled styrene, 20 grams of air-blown ketonized castor oil obtained according to the procedure of Example IV, and in which the duration of air-blowing was eleven days, 40 grams of xylene and one gram of benzoyl peroxide were heated with stirring at a reflux temperature for 16 hours, the reflux temperature being 105° C. The reaction product formed a clear, tacky film which became tack-free on standing for 24 hours.

*Example IX*

Twenty grams of redistilled styrene, 20 grams of ketonized castor oil obtained according to Example V, 40 grams of xylene, and 1 gram of benzoyl peroxide were stirred and heated at a reflux temperature for 16 hours, the reflux temperature being 105° C. The styrenated oil produced formed a clear, tacky film which became tack-free after standing for 24 hours.

The presence of drying catalysts in the styrenated oils results in a substantial shortening of the time required for drying to a tack-free state.

Since certain features in connection with the above process for the oxidation of castor oil and the preparation of the novel ketonized oils of this invention may be made without departing from the scope of the invention, it is intended that all material contained in the description is to be interpreted as illustrating and not limiting the scope of the invention.

What is claimed is:

1. A process for the oxidation of castor oil comprising heating castor oil in solution in an inert organic solvent and a ketone, selected from the group which consists of low molecular weight aliphatic and acyclic ketones, with a compound of the class of low molecular weight aluminum secondary and tertiary alkoxides, for a period of time of not longer than about 15 minutes and at a temperature not substantially above 115° C. to provide oxidized castor oil in which the predominant components are glycerides of 12-keto-oleic acid.

2. A process for the oxidation of castor oil comprising heating castor oil in solution in an inert organic solvent and a ketone, selected from the group which consists of low molecular weight aliphatic and acyclic ketones, with a compound of the class of low molecular weight aluminum secondary and tertiary alkoxides, for a period of time of from about 15 minutes to about 45 minutes and at a temperature of at least 115° C. to provide a mixture of glycerides of 12-keto-oleic acid and 12-keto-10-octadecenoic acid.

3. A process for the oxidation of castor oil comprising heating castor oil in solution in an inert organic solvent and a ketone, selected from the group which consists of low molecular weight aliphatic and acyclic ketones, with a compound of the class of low molecular weight aluminum secondary and tertiary alkoxides, for a period of time of at least about 45 minutes and at a temperature of at least about 115° C. to provide oxidized castor oil in which the predominant components are glycerides of 12-keto-10-octadecenoic acid.

4. A process for the oxidation of castor oil comprising heating castor oil in solution in an inert organic solvent and a ketone, selected from the group which consists of low molecular weight aliphatic and acyclic ketones, with a compound of the class of low molecular weight aluminum secondary and tertiary alkoxides, for a period of time of from about 10 to 15 minutes and at a temperature of 110–115° C. to provide oxidized castor oil in which the predominant components are glycerides of 12-keto-oleic acid.

5. A process for the oxidation of castor oil comprising heating castor oil in solution in an inert organic solvent and a ketone, selected from the group which consists of low molecular weight aliphatic and acyclic ketones, with a compound of the class of low molecular weight aluminum secondary and tertiary alkoxides, for a period of time of from one to six hours at a temperature of 126–130° C., to provide oxidized castor oil in which the predominant components are glycerides of 12-keto-10-octadecenoic acid.

6. A process according to claim 1 in which the aluminum alkoxide is aluminum isopropoxide.

7. A process according to claim 1 in which the aluminum alkoxide is aluminum tertiary butoxide.

8. A process according to claim 3 in which the aluminum alkoxide is aluminum isopropoxide.

9. A process according to claim 3 in which the aluminum alkoxide is aluminum tertiary butoxide.

10. Oxidized castor oil in which the predominant component is selected from the class consisting of glycerides of 12-keto-oleic acid, glycerides of 12-keto-10-octadecenoic acid, and mixtures thereof.

11. Oxidized castor oil in which the predominant components are glycerides of 12-keto-oleic acid.

12. Oxidized castor oil in which the predominant components are glycerides of 12-keto-10-octadecenoic acid.

References Cited in the file of this patent

UNITED STATES PATENTS 2,623,888    Nichols _____ Dec. 30, 1952

OTHER REFERENCES

Adams et al.: Organic Reactions, vol. II, pp. 178–223.
Adams et al.: Organic Reactions, vol. VI, copyright 1951, pp. 207–272.